United States Patent [19]

Sawyer et al.

[11] Patent Number: 4,773,663
[45] Date of Patent: Sep. 27, 1988

[54] RECUMBENT BICYCLE

[76] Inventors: Kevin A. Sawyer, 417 Mountain Veiw Ave., Mountain View, Calif. 94041; Raymond A. Brindos, 3112 Zion La., San Jose, Calif. 95132

[21] Appl. No.: 130,470

[22] Filed: Dec. 9, 1987

[51] Int. Cl.⁴ .............................................. B62M 1/02
[52] U.S. Cl. .................... 280/261; 280/263; 280/274; 280/270; 280/281 LP
[58] Field of Search ............... 280/259, 260, 261, 263, 280/274, 270, 281 R, 281 B, 281 LP, 282

[56] References Cited

U.S. PATENT DOCUMENTS

| | | | |
|---|---|---|---|
| 1,342,688 | 6/1920 | Millward | 280/259 |
| 1,598,869 | 9/1926 | McCann | 280/259 |
| 2,482,472 | 9/1949 | Fried | 280/287 |
| 4,534,578 | 8/1985 | Keller | 280/281 B |

OTHER PUBLICATIONS

SAE Technical Paper 840021, "Evolution of Recumbent Bicycles and the Design of the Avatar Bluebell", David Gordon Wilson et al., Feb. 1984.

Primary Examiner—David M. Mitchell
Assistant Examiner—Donn McGiehan
Attorney, Agent, or Firm—Gregory O. Garmong

[57] ABSTRACT

A recumbent bicycle is powered by the driving of a crank spindle that rotates on an axis generally coincident with that of the front wheel. The crank spindle is disposed within a spindle housing supported from the front of the bicycle frame, and the spindle housing supports the front wheel through a steerably turnable intermediate hub. Steering of the handlebars causes the front wheel to turn to steer the bicycle, while the crank spindle remains in a fixed orientation to the frame so that the bicycle can be continuously driven with pedals connected to the crank spindle, which in turn is connected to the rear wheel through a sprocket and drive chain assembly.

18 Claims, 6 Drawing Sheets

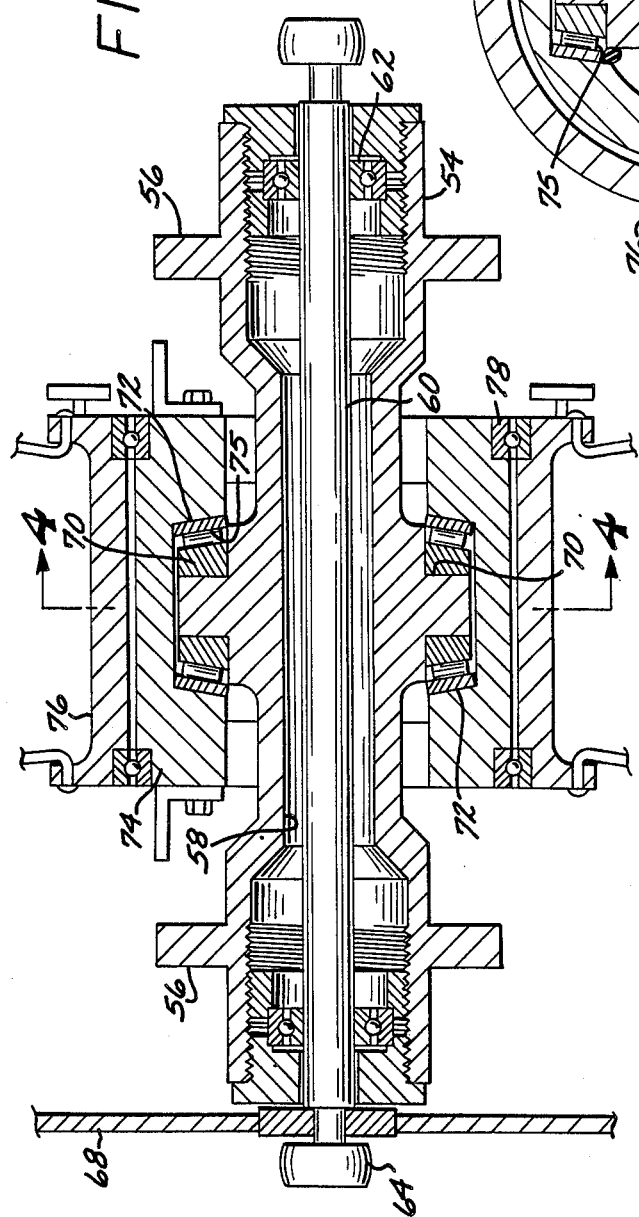
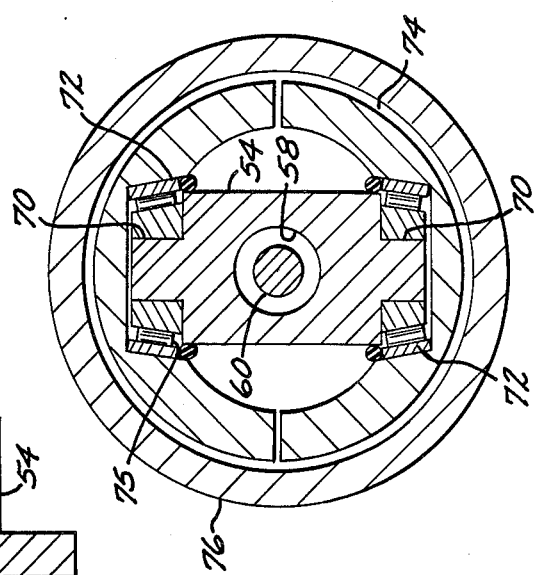

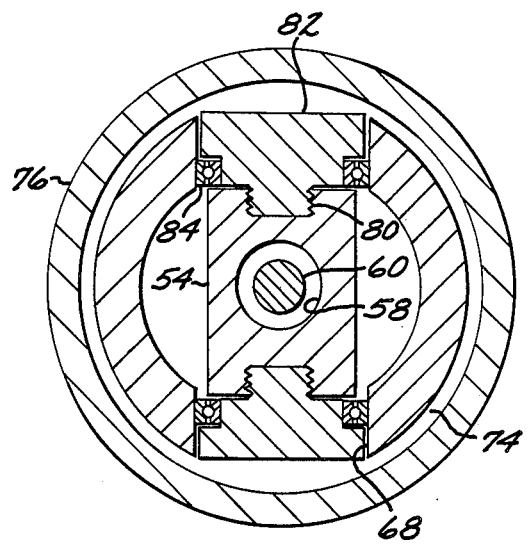
FIG. 7
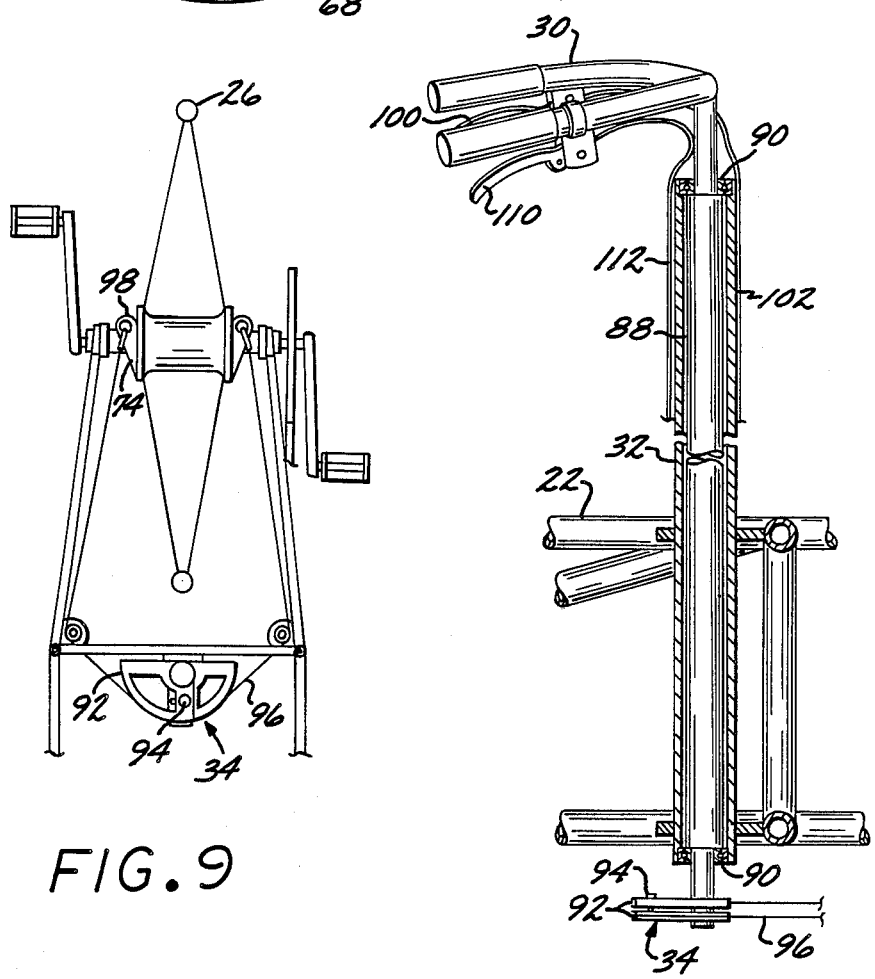
FIG. 8
FIG. 9

RECUMBENT BICYCLE

BACKGROUND OF THE INVENTION

This invention relates generally to bicycles, and, more particularly, to the construction of a recumbent bicycle.

Bicycles are vehicles having two wheels mounted, one behind the other, to a frame upon which the rider sits. The bicycle is conventionally driven by the rotation of pedals connected to a crank arm, which in turn rotates a front sprocket. The front sprocket is connected to the rear wheel by a chain and rear sprocket, so that rotation of the pedals forces rotation of the rear wheels. Alternatively, the bicycle may be powered by a small engine. The front wheel is mounted to a front fork that in turn is connected to movable handlebars, permitting the front wheel to be turnably steered by turning of the handlebars. In the United States, bicycles are now largely used for recreation, while in some countries they provide a primary means of transportation.

In the conventional or standard bicycle, the rider sits generally upright on a saddle-like seat about 36 inches above the ground (depending upon the length of the rider's legs and personal preference), and the pedals and front sprocket are generally vertically directly below the center of gravity of the rider. The rider is thus in a sitting position, but is largely vertical and can quickly rise from the seat to a standing position, so that more force can be applied to the pedals. The standard bicycle is familiar to most persons, and has become highly popular as an efficient, if rather slow, means of transportation and recreation.

In another form of bicycle, the recumbent bicycle, the rider sits closer to the ground on a bench-type seat, in a true sitting position with his legs extending forwardly. The pedals and front sprocket are well in front of the rider, but are pedaled in the same fashion to power the bicycle. The recumbent bicycle has important advantages over the standard bicycle in reduced wind resistance, better downhill performance, and increased comfort of the bench seat over the saddle seat.

The recumbent bicycle is used in bicycle speed trials and in specialty racing, but has not generally received the widespread acceptance of the standard bicycle, despite its many advantages. One reason for its lack of acceptance is a result of the design restrictions imposed upon the recumbent bicycle by the relative positioning of the front wheel and the crank spindle upon which the pedals are mounted. Since the front wheel must be free to rotate, in typical recumbent bicycles the transverse crank spindle is supported to the frame either behind the front wheel, above the front wheel, or in front of the front wheel. When the crank spindle is behind the front wheel, the bicycle becomes very long and difficult to steer, because the frame must be long enough for the rider's legs to extend forward to the pedals, and must have additional length to support the front wheel forward of the crank. When the crank spindle is in front of the front wheel, the front wheel must be made sufficiently small to fit between the rider's legs, so that the rider's legs can comfortably reach forward to the pedals. This arrangement leads to highly unstable handling characteristics, short life for the small front wheel, and an inability to maintain supplies of front wheels (and rear wheels, in those cases where the rear wheels are made the same size as the front wheel). When the crank spindle is located above the front wheel, the front wheel must be made smaller than that of the standard bicycle due to the length of the rider's legs. Even with reduced size of the front wheel, in some designs the rider's legs are inclined upwardly, so that blood tends to leave the rider's legs and long term pedalling becomes fatiguing. The upward inclination of the legs gives the rider a sense of instability and insecurity, adding to the problem of decreased stability of handling.

There therefore exists a need for a recumbent bicycle which has the established advantages of recumbent bicycles generally, but also has an improved construction that avoids the problems of prior recumbent bicycles. Such a recumbent bicycle should have an intermediate length wheelbase which is long enough for good stability and short enough for good steerability, and which is comfortable and efficient for rides of extended duration. Such an improved recumbent bicycle would, it is believed, add greatly to the acceptability and use of recumbent bicycles. The present invention fulfills this need, and further provides related advantages.

SUMMARY OF THE INVENTION

The present invention is embodied in a recumbent bicycle of intermediate length wheelbase, wherein the rider sits in a comfortable position on a bench-type seat. The bicycle is stable and steerable. The force that can be produced by the rider's legs is efficiently utilized. Particularly when a fairing is used to reduce wind resistance, cruising speeds of 30 to 40 miles per hour can be achieved with the same exertion required to reach 20 miles per hour on a standard bicycle, making the improved recumbent bicycle a realistic candidate for regular transportation.

In accordance with the invention, a recumbent bicycle comprises a frame having a seat thereupon; wheel means for permitting the bicycle to roll on the ground, the wheel means including a rotatable rear wheel supported by the frame, and a rotatable front wheel; front wheel support means for supporting and steerably turning the front wheel, and including a center bore therethrough extending transversely to the frame and substantially coaxial with the axis of rotation of the front wheel; and drive means for driving the bicycle, the drive means including a crank spindle disposed within the center bore, for providing motive power to the bicycle.

More specifically, and in accordance with the invention, a recumbent bicycle comprises a frame having a seat, a front wheel support, and a rear wheel support, the front wheel support including a front fork with two arms extending from the frame; a spindle housing mounted transverse to the front fork, the spindle housing being fixedly supported by the two arms of the front fork and including a center bore therethrough; a front drive train assembly, including a crank spindle disposed within the center bore of the spindle housing, and being rotatably supported therein by a crank spindle bearing, a front sprocket mounted on one end of the crank spindle, a pair of pedal crank arms, one mounted on each end of the crank spindle and extending generally perpendicular to the crank spindle, and a pair of pedals, one mounted to each of the pedal crank arms; a front wheel assembly, including an intermediate hub steerably mounted on the spindle housing by an intermediate hub bearing, and a front wheel mounted on the intermediate hub by a front wheel bearing; a rear wheel assembly adapted for attachment to the rear wheel support and including a rear wheel rotatably mounted on a rear wheel axle; a rear sprocket mounted to the rear wheel support, and adapted for driving the rear wheel assembly; and a drive chain extending from the front sprocket to the rear sprocket.

In the bicycle of the invention, the crank spindle for the pedals is disposed within the center of the hub of the front wheel, through the use of a spindle housing. The spindle housing is fixedly mounted at the front of the frame, to a forwardly extending portion of the frame termed the front fork. The spindle housing has a hollow center bore therethrough, extending transversely to the frame and the wheels. The crank spindle is supported within the bore by a crank spindle bearing set, preferably two ball bearings, one at each end of the spindle housing.

The front wheel includes a wheel hub, which is rotatably mounted on an intermediate hub with a front wheel bearing set, preferably two ball bearings, one at each end of the intermediate hub. The intermediate hub, and thence the front wheel, is turnably mounted on the spindle housing with an intermediate hub bearing set, preferably a pair of tapered roller bearings. The pair of tapered roller bearings are mounted generally on the top center and bottom center of the spindle housing to form a generally vertical axis about which the front wheel is turned, with the top roller bearing having the rollers disposed upwardly and the bottom roller bearing having the rollers disposed downwardly. The intermediate hub is then supported on these two intermediate hub bearings.

With this design, the crank spindle is disposed at a longitudinal position along the bicycle that permits the bicycle frame to be made of an intermediate length having a combination of good stability and good handling characteristics. The pedals are slightly below the height of the seat, so that the rider is not forced to pedal with the legs upwardly inclined. The rider is therefore much more comfortably positioned for riding, as compared with recumbent bicycles having the crank spindle positioned over the wheel to reach the same frame length as attained in the present bicycle.

The front drive sprocket is mounted on one end of the crank spindle, usually the right end facing forwardly in conformity with conventional bicycle practice. A drive chain extends from the front sprocket to the rear sprocket and rear wheel, so that the bicycle is driven by rotating the crank spindle. Pedal crank arms are supported on the outer ends of the crank spindle, generally perpendicularly to the axis of the crank spindle and set 180 degrees apart in the manner of conventional bicycle crank arms. The pedals are rotatably mounted at the end of each of the crank arms, so that the pushing of the pedals to move in a circular motion causes the crank spindle and front sprocket to turn. The chain is then moved, transmitting power to the rear wheel and driving the bicycle.

The position and orientation of the crank spindle is fixed relative to the frame and rider, even when the front wheel is turned about the axis defined by the intermediate hub bearing set to turn the bicycle. This permits the bicycle to be steadily pedaled even through turns, and avoids the possibility of the chain slipping off the front sprocket.

The front wheel is preferably turned by operation of the handlebars. The handlebars are supported on a vertical handlebar support bar, which in turn is supported by bearings in the frame. At the lower end of the handlebar support bar is a cam which is turned from side to side by the movement of the handlebars. Cables are attached to each side of the cam. One of the cables extends forwardly on each side of the frame, and is attached to the two transverse ends of the intermediate hub. Turning of the handlebars rotates the cam, which moves the cables and thence the intermediate hub. The front wheel is thus turned, without altering the relative position of the crank spindle and while the front wheel continues to rotate. Steering with this system is accurate and without backlash, if the cables are properly adjusted to the cam.

The recumbent bicycle of the invention preferably includes a gear shift and rear brakes, conventional features typically provided in multiple speed bicycles. Specifically, a rear derailleur is mounted to the rear sprocket, which is of compound multiple sprocket design. A gear shift cable extends from the rear derailleur to a manual gear shift mounted on the handlebars or the frame. Operation of the manual gear shift permits shifting of gears. A rear brake is provided for the rear wheel. The rear brake is of any type suitable for use on bicycles, such as a caliper brake. A brake control cable extends from the brake to a brake control lever, which is preferably mounted on the handlebars so that the brake can be operated without requiring the rider to move his hands from the handlebars.

Because the legs of the rider extend generally forwardly from the hips during the pedaling of the bicycle, it is not necessary to use a narrow saddle seat of the type used on standard bicycles, where the legs of the rider extend generally downwardly from the hips during pedaling. A bench seat with a backrest is instead provided for the rider. The use of the comfortable bench seat for the rider avoids the soreness of the buttocks that is a common complaint of occasional riders of standard bicycles. The seat is fixed to a seat support that is readily adjustable forwardly and backwardly relative to the frame, so that the bicycle can be readily adjusted to fit riders of varying leg lengths.

The back of the seat also is the reaction surface for much of the force generated by the rider as he pedals the bicycle. In conventional bicycles, the force that can be applied is typically limited to about that corresponding to the weight of the rider, when the rider rises from the seat and stands on the pedals. The force that can be applied in the present bicycle is typically greater than the weight of the rider, since when force is applied, the back and buttocks of the rider are braced against the seat back. This bracing permits the rider to apply as much force as possible with the rider's leg strength, independent of his weight.

The bicycle of the invention provides an important advance in the art of recumbent bicycles. By disposing the crank spindle through the center of the front hub using the hub and bearing arrangement of the invention, the bicycle frame can be made of an intermediate length that is both stable and turnable. It also permits the frame to be made light, an important consideration in both competition and recreational bicycles. The rider is comfortably positioned, and can ride at high speeds for long periods without undue fatigue. Other features and advantages of the invention will be apparent from the following more detailed description of the preferred embodiment, taken in conjunction with the accompanying drawings, which illustrate, by way of example, the principles of the invention.

BRIEF DESCRIPTION OF THE DRAWINGS

FIG. 3 is a front sectional view of the front hub and bearing assembly of FIG. 2;

FIG. 4 is a side sectional view of the front hub and bearing assembly, taken generally along line 4—4 of FIG. 3;

FIG. 7 is a side sectional view of another embodiment of the front hub and bearing assembly, in the same view as FIG. 4;

FIG. 8 is a side elevational view of the handlebar support column, with portions broken away or in section for clarity;

FIG. 9 is a top plan view of the steering mechanism and cam;

DETAILED DESCRIPTION OF THE PREFERRED EMBODIMENT

Figures 1, 2:
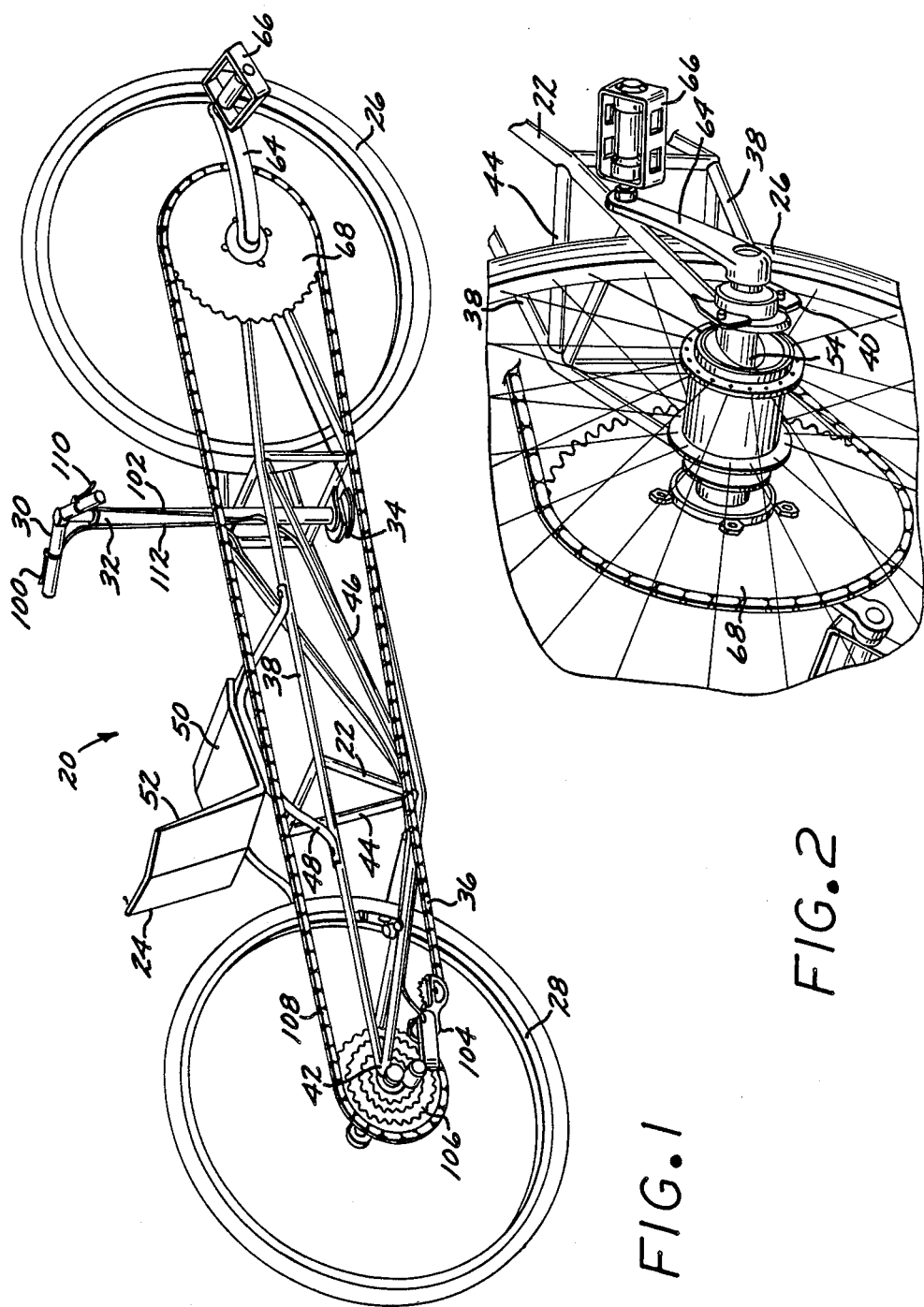
FIG. 1 is a perspective view of the bicycle of the invention.
FIG. 2 is an enlarged perspective view of the front of the bicycle.

The present invention is embodied in a recumbent bicycle 20, illustrated generally in FIG. 1. (Although illustrated in relation to a preferred two-wheel bicycle, the invention can be used in relation to a three-wheel tricycle having a steerable front wheel. In that sense the term bicycle, as used herein, encompasses and includes the term tricycle.) The recumbent bicycle 20 includes a frame 22, to which is rigidly but adjustably fixed a seat 24 for the rider. A front wheel 26 is rotatably and turnably supported from the front end of the frame 22, and a rear wheel 28 is rotatably supported from the rear end of the frame 22. A handlebar 30 is mounted on a handlebar support 32, projecting upwardly from the frame 22 to be within comfortable reach of the rider. The front wheel 26 is turned from side to side when the handlebar 30 is turned, by a steering mechanism 34. A drive train 36 permits the rear wheel 28 to be driven by the action of the rider in pedaling the bicycle 20. As will be discussed in greater detail, a key feature of the drive train 36 is the mounting of its forward components substantially on the axis of rotation of the front wheel 26.

The frame 22 supports the remaining components of the bicycle 20 and the rider. It should be light, rigid, and strong. These properties are achieved through a combination of the design of the frame 22 and the selection of the material of construction. In its preferred embodiment, the frame 22 is constructed in the form of a reinforced box having four longitudinal members 38 extending the length of the frame 22, and arranged in a generally rectangular configuration when viewed in cross section. At the front end and rear end, the longitudinal members 38 are gathered together to form a front fork 40 and rear fork 42, to which the respective wheels 26 and 28 are attached. In the intermediate portions of the frame 22, both transverse cross bracing 44 and longitudinal cross bracing 46 are provided to add rigidity and strength to the frame 22. The frame is preferably constructed of tubing of a a strong, lightweight material such as 4130 steel.

The seat 24 is fixed to the two uppermost longitudinal members 38, by a seat support 48. The seat support 48 is also a light, rigid, strong material, which is clamped to the frame 22. The seat 24 is slidable longitudinally relative to the frame 22 when the clamping force is released, to permit the position of the seat 24 to be adjusted forward and rearward. When the correct position for a particular rider is found, the clamping force is reapplied, and the seat position is maintained until further adjustment is needed. The clamping force can be supplied by bolts that join the support 48 to the frame 22, or by clamps such as spring loaded clamps.

The seat 24 is of a bench type, rather than a saddle design such as found in standard bicycles. In standard bicycles, the legs of the rider are disposed generally downwardly from the waist, and the seat must be sufficiently narrow to fit between the rider's legs. This requirement has led to the use of saddle seats of a narrow, hard construction, and having no back rest for back support. Such conventional seats may be uncomfortable for the rider, and particularly for the recreational rider who occasionally rides the bicycle. By contrast, in the present bicycle 20 the legs of the rider are disposed generally forwardly from the hips, leading to the use of the term "recumbent" to describe the bicycle 20. Because the seat 24 does not fit between the legs of the rider, it need not be of the saddle design. Instead, a bench type of seat with a seat bottom 50 and a seat back 52 is used. The seat 24 is typically wider than the buttocks of the rider, providing full-width support, and can be fully cushioned for further comfort. As the rider pedals the bicycle 20, the lower back is supported by the seat back 52, improving comfort and providing leverage to apply additional driving force to the bicycle 20.

The structure of the front wheel support and drive train at the front end of the bicycle 20 is important to the design and functioning of the bicycle 20, and is shown, for one embodiment, in greater detail in FIGS. 2-5. A spindle housing 54 is mounted between the longitudinal members 38 at the front fork 40, generally transversely to the frame 22. The spindle housing 54 includes integral flanges 56 near each end, with bolt holes therein for bolting the spindle housing 54 to the front fork 40. The spindle housing 54 is fixedly supported in the frame 22, and does not rotate on its axis or turn from side to side, relative to the frame 22.

The spindle housing 54 supports the forward pedal crank spindle of the drive train 36 in a rotational fashion, and also supports the front wheel 26 in a rotatable and turnable fashion.

The spindle housing 54 is hollow, with a center bore 58 therethrough. Disposed within the center bore 58 is a cylindrical rod crank spindle 60, which is bored and tapped on each end. The crank spindle 60 is rotatable supported on a pair of crank spindle bearings 62, so that the crank spindle 60 can freely rotate within the spindle housing 54. The crank spindle bearings 62 are preferably conventional ball bearing assemblies.

A pedal crank arm 64 is rigidly bolted onto each of the bored and tapped ends of the crank spindle 60. Each pedal crank arm 64 extends at right angles to the axis of the crank spindle 60, and the pedal crank arms 64 are angularly displaced 180 degrees from each other. A pedal 66 is rotatably supported at the distal end of each of the pedal crank arms 64, with the axis of rotation of the pedal 66 parallel to, but displaced from, the axis of rotation of the crank spindle 60. A front sprocket 68 is bolted to one end of the crank spindle 60, usually the right end in a forward view. Movement of the pedals in a circular path imparts the force of the rider's legs to the crank arms 64, and thence to the crank spindle 62 and the front sprocket 68. The orientation of the front sprocket 68 and the axis of rotation of the pedals 66 remain fixed during rotation of the pedals 66, and during turning of the bicycle 20 in the manner to be subsequently described. The ability of the rider to apply power to the bicycle 20 through the pedals 66 is not impaired by the turning of the bicycle 20.

A rodlike intermediate hub bearing support 70 extends upwardly from the top of the spindle housing 54, and a second rodlike intermediate hub bearing support 70 extends downwardly from the bottom of the spindle housing 54. As indicated, the supports 70 extend generally upwardly and downwardly, but may be angled backwardly or forwardly by unbolting the flanges 56 from the front fork 40, turning the flanges to the next matching bolting position, and re-attaching the flanges 56 to the front fork 40. This movement permits the adjustment of the head angle, which is the angle between the hub bearing support 70 and the vertical to the ground upon which the bicycle 20 sits. A small head angle (i.e., with the bearing support 70 nearly vertical) induces fast steering of the bicycle 20 so that the bicycle 20 itself must be restrained from turning. A large head angle (i.e., with the upper bearing support 70 tilted backwardly and the lower bearing support 70 tilted forwardly) induces slow steering of the bicycle and greater stability to turning, so that positive force must be applied to the handlebars 30 to turn the bicycle 20. A feature of the present invention is that the head angle can be readily adjusted without changing components, which is not possible with other bicycles.

Mounted to the two intermediate hub bearing supports 70 are a pair of intermediate hub bearings 72. These bearings 72 are preferably inclined roller bearings of the type conventionally termed "Timken bearings", which permit smooth rotational movement about the axis of the bearing supports 70.

An intermediate hub 74 is supported on the intermediate hub bearings 72, in a manner that does not permit the intermediate hub 74 to rotate, but does permit it to pivot and turn from side to side on the bearings 72. The intermediate hub 74 is a hollow thick-walled cylinder of sufficient internal diameter to fit over the outside of the spindle housing, and to turn thereon. A pair of intermediate hub bearing races 75 are machined into the thick wall of the intermediate hub 74, oppositely disposed from each other so as to fit together with the two intermediate hub bearings 72. The shape of the races 75 conform with the bearing pattern of the bearings 72, and, for the preferred tapered roller bearings, are angled inwardly to fit together with the rollers.

Figure 5:
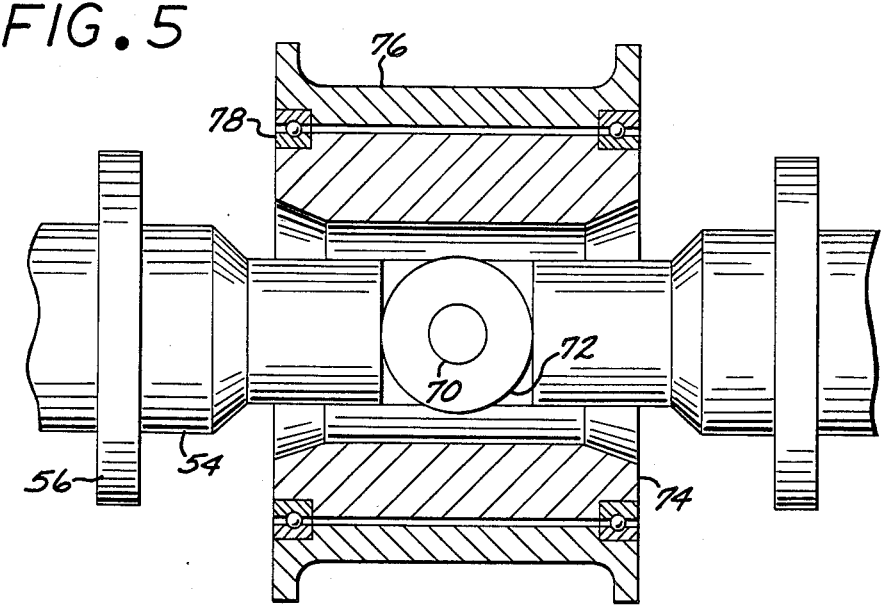
FIG. 5 is a top sectional view of the front hub and bearing assembly of FIG. 3.
Figure 6:
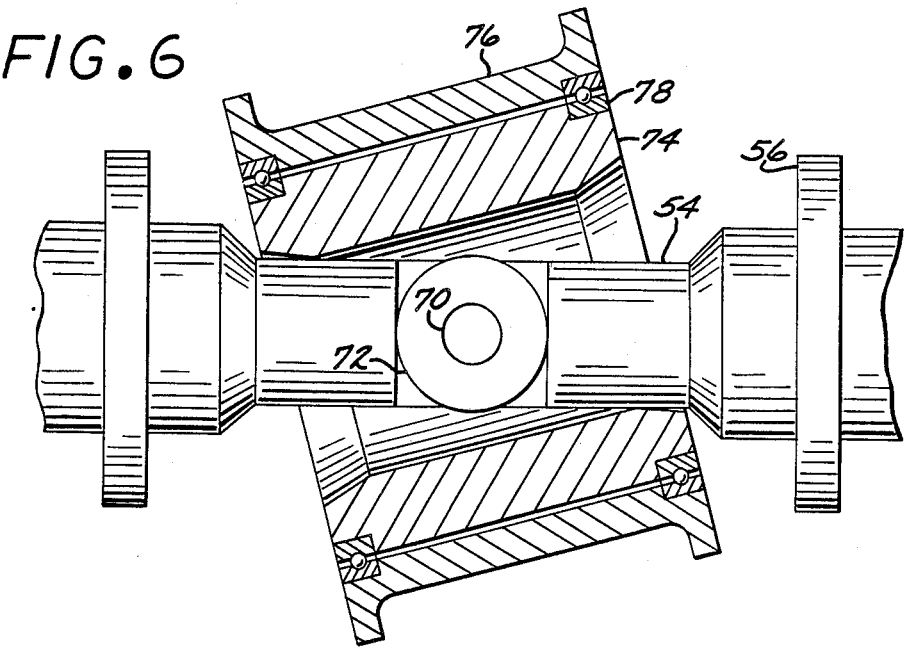
FIG. 6 is a top sectional view similar to that of FIG. 5, except with the intermediate hub positioned as when the front wheel is turned.

FIG. 6 shows the same view as FIG. 5, except with the intermediate hub 74 turned on the bearings 72 to its fullest extent in respect to the spindle housing 54. The turning of the intermediate hub 74 is limited by its contacting to the spindle housing 54 at full turning, and this degree of permitted turning may be varied to some extent by changing the relative dimensions and configuration of the intermediate hub 74 and the spindle housing 54. For normal riding of the bicycle 20, 20 degrees of turning to either side is sufficient.

The front wheel 26 is rotatably mounted to the intermediate hub 74. The front wheel 26 includes, at its center, a cylindrical front wheel hub 76, to which the wheel spokes are joined to support the wheel rim and tire of the front wheel 26. A pair of front wheel bearings 78, one at each transverse end of the front wheel hub 76, are positioned between the front wheel hub 76 and the intermediate hub 74, to permit the front wheel hub to rotate with respect to the intermediate hub 74.

The function of the spindle housing 54, and the related mechanism supported inside and outside the spindle housing 54, will now be apparent. In cooperation, these elements permit the bicycle to be driven through pedal actuated rotation of the crank spindle 60, which is disposed substantially coaxially with the axis of rotation of the front wheel 26. Preferably, the axis of the crank spindle 60 exactly coincides with the axis of rotation of the front wheel 26. Because the crank spindle 60 extends through the center of the hub of the front wheel 26, the frame 22 can be constructed to an intermediate length sufficiently long to be stable, and sufficiently short to be readily turnable. Equally importantly, the front wheel is of a standard size, and need not be of reduced size to accommodate the ergonomic limitations of the rider. The life of the front tire is prolonged as compared with the smaller tires used on short wheelbase recumbent bicycles, and the weight distribution of the rider is better spread over the two wheels.

By contrast, prior recumbent bicycles have the crank spindle either forward of the front wheel, above the front wheel, or behind the front wheel. Placing the crank spindle forward of the front wheel requires a very short, unstable wheelbase and an undersized front wheel. Placing the crank spindle above the front wheel, to gain an intermediate length wheelbase, requires the rider's legs to be inclined upwardly, in an uncomfortable position that is also perceived by the rider to be unstable. Placing the crank spindle behind the front wheel requires a very long wheelbase for the bicycle, resulting in extreme difficulty in handling. The mechanism of the present bicycle may also be contrasted with that found in some very old bicycles which are front wheel driven and wherein the rider sits generally upright. In such bicycles, the front wheel is steered from the handlebars by a movable front fork, and there are pedal cranks rigidly attached to the axis of the front wheel. This design would not permit a rear wheel drive of the bicycle, as in the present bicycle, because the turning of the front wheel would interfere with the smooth chain movement on the front sprocket. Finally, the present approach is also contrasted with that of the current standard upright bicycle, wherein the pedals and sprocket are mounted between the front and rear wheels and generally vertically below the rider.

Thus, in the present mechanism the spindle housing 54 is rigidly mounted to the front fork 40 of the frame 22. The crank spindle 60 is disposed within the center bore 58 of the crank spindle housing 54 on bearings 62. Moving the pedals 66 rotates the front sprocket 68, driving the bicycle 20. The front wheel 26 is also mounted to the spindle housing 54, in a manner that permits it to rotate and also turn from side to side to steer the bicycle 20. The rotational and turning movements are permitted by placement of the intermediate hub 74 between the spindle housing 54 and the front wheel hub 76. The front wheel hub 76 rotates with respect to the intermediate hub 74 on bearings 78, so that the front wheel 26 can rotate in its normal fashion. The intermediate hub 74 pivots from side to side with respect to the spindle housing 54, so that the front wheel 26 mounted thereupon can be turned from side to side to steer the bicycle 20.

In the presently preferred mechanism illustrated in FIGS. 3-5, the intermediate hub 74 is longitudinally split into two clamshell halves, so that the intermediate hub 74 can be assembled over the bearing supports 70 and the bearings 72. The two halves are then held together by the overlying front wheel hub 76 and the bearings 78.

Other designs are contemplated and are within the scope of the invention, as, for example, the design illustrated in FIG. 7. In this approach, female threads 80 are provided in the upper and lower sides of the spindle housing 54. A male-threaded intermediate hub bearing support 82 is threaded into the female threads 80. The bearing support 82 receives and supports an intermediate hub bearing 84, which permits the intermediate hub 74 to be pivoted and turned with respect to the spindle housing 54, as with the previously described approach. The bearing 84 of this design is preferably a ball bearing rather than a roller bearing.

The intermediate hub 74 differs from the split cylinder configuration previously described in relation to FIGS. 3-5, in that it is not split to permit assembly. Instead, the intermediate hub 74 illustrated in FIG. 7 is a solid cylinder, except that it has a bearing insertion bore 86 machined through the top and bottom of the cylinder, at about its lengthwise center, of sufficient diameter that the bearing support 82 and intermediate hub bearing 84 can be inserted through the bore 86.

To assemble the mechanism of FIG. 7, the intermediate hub 74 is first assembled over the spindle housing 54 without the bearing support 82 and bearing 84 in place. The bearing support 82 and bearing 84 are then fixed to the spindle housing 54 by screwing the bearing support 82 into the female threads 80 of the spindle housing 54. The front wheel hub 76 is assembled over the intermediate hub 74, together with the bearings 78.

The alternative structure for the mechanism, illustrated in FIG. 7, reduces the cost of manufacture of the mechanism, and also permits the outer diameter of the intermediate hub 74 to be reduced, thereby also reducing its weight. Preferably, at least one of the flanges 56 is reduced in diameter so that the inner diameter of the intermediate hub 74 can also be reduced, yet still be large enough to be assembled by sliding over the flange. Another advantage of the alternate mechanism of FIG. 7 is that the female threaded portion 80 of the spindle housing 54, into which the bearing support 82 is threaded, can be readily offset from the illustrated symmetrical position, either from side to side or in the forward or rearward directions. These adjustments permit further fine tuning of the steerability of the bicycle, by moving the axis of turning of the front wheel 26 accordingly. Side to side movement might be helpful for use in racing bicycles that are to be run on a continuously banked track, so provide a bias to the steering of the bicycle. Rearward and forward movement can be used in conjunction with head angle adjustments to alter the handling characteristics of the bicycle.

Figure 12:
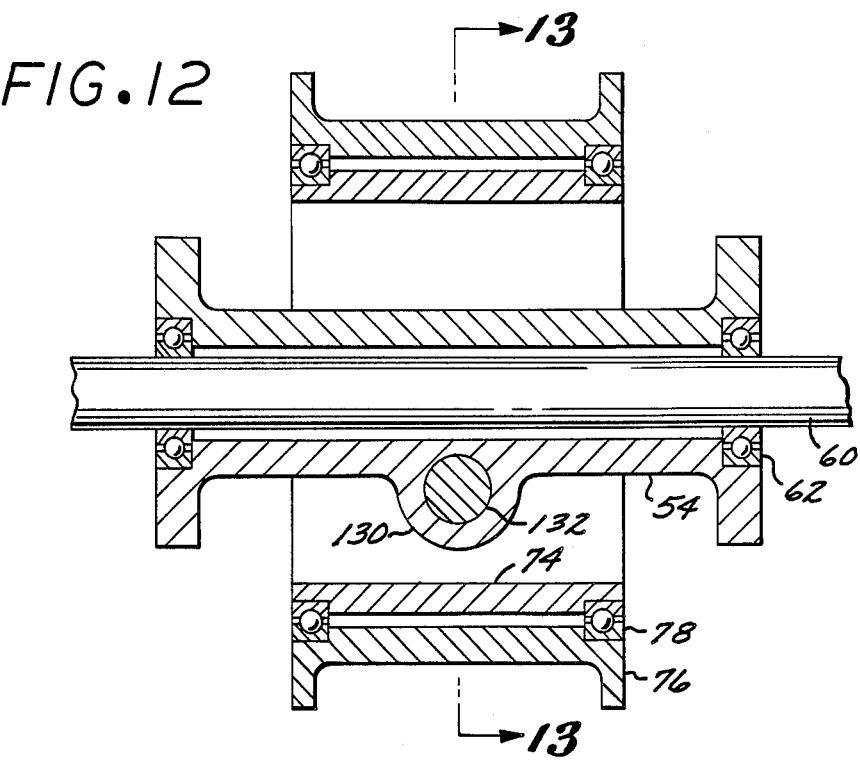
FIG. 12 is a top sectional view of another embodiment of the front hub and bearing assembly, in the same view as FIG. 5.
Figure 13:
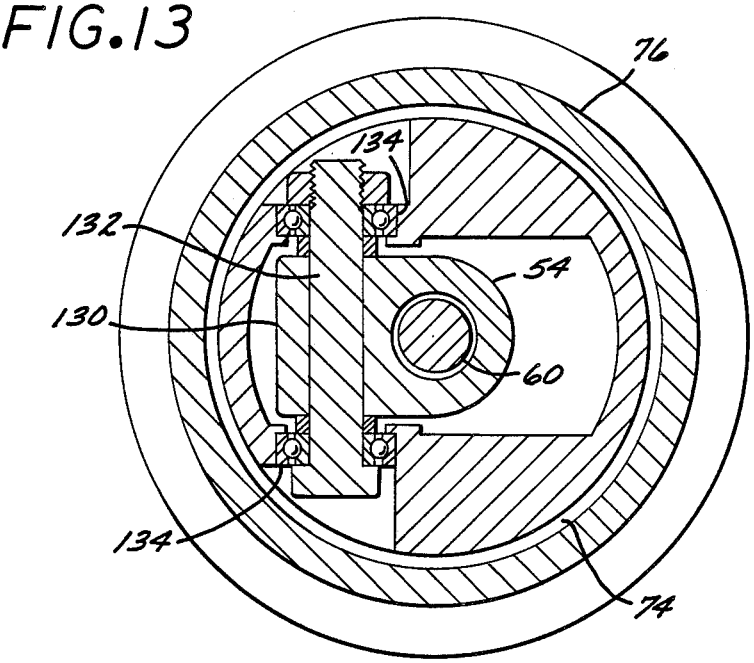
FIG. 13 is a side sectional view of the embodiment of FIG. 12, taken along line 13—13.

Rearward and sideways adjustability are achieved in another embodiment illustrated in FIGS. 12 and 13. As in the other approaches, the crank spindle 60 is mounted to the spindle housing 54 by crank spindle bearings 62. Also, the front wheel hub 76 is supported on the intermediate hub 74 by front wheel bearings 78. However, the intermediate hub 74 is turnably supported on the spindle housing 54 by an alternative approach.

In this approach, the spindle housing 54 has a rearward extending portion 130 with a bore therethrough which receives a generally vertically extending pin 132 fitted therein. At its upper and lower ends the pin 132 is supported from the intermediate hub 74 by bearings 134, which are preferably angular contact bearings and perform the same wheel-turning function as the intermediate hub bearings 72. In this design, the centerline of the pin 132 is displaced rearwardly from the vertical line through the crank spindle 60, and could also be readily displaced sideways to achieve particular steering characteristics.

The front wheel 26 is steered by turning the handlebars 30, thereby pivoting the intermediate hub 74, and thence the front wheel 26, with respect to the frame 22, through a steering linkage to be described next. FIG. 8 illustrates in detail the handlebar support 32 to the intermediate hub FIG. 9 illustrates the details of the linkage from the handlebar support 32 to the intermediate hub 74. The handlebars 30 are fixed to a vertical tube 88, which fits within the support tube 32. The vertical tube is rotatably mounted at each end thereof by a handlebar rotation bearing 90, which is preferably a conventional ball bearing mechanism. The handlebar support 32 is fixed to the frame 22, as by welding.

A cam 92 is clamped to the bottom of the vertical tube 88, in an arrangement illustrated more fully in FIG. 9. The cam 92 is generally of the form of a half circle fabricated in two interconnecting quarter circles. An adjustment bolt 94 fits through a hole in one of the two parts, and through a slot in the other. The relative orientation of the two parts can be varied over a limited range by loosening the bolt 94, moving the two parts relative to each other, and then re-tightening the bolt 94.

A cable 96 is clamped to the circumference of each of the two parts making up the cam 92. Each of the cables extends forwardly along one side of the frame 22, and connects with a clevis pin to an eyelet 98 connected to the outermost end of the intermediate hub 74. At installation, each cable 96 is installed to be of approximately the correct length so as to reach from the clamping point on the circumference of the cam 92, to the corresponding eyelet 98. The adjustment bolt 94 is then used to move the two halves of the cam 92 relative to each other, to provide fine adjustment to the cable lengths. With this arrangement, turning of the handlebars 30 correspondingly moves the cam 92, and causes the cables 96 to pivot the intermediate hub 74 in the same direction as the handlebars 30 are turned. The front wheel 26, which is rotatably mounted to the intermediate hub 74, is turned in the same direction to steer the bicycle 20.

Also mounted on the handlebars 30 is a gear shift lever 110. Upon activation, the gear shift lever 110 operates a gear shift cable 102 that runs from the gear shift lever 110, down the outside of the handlebar support 32, rearwardly along the frame 22, and to a derailleur gear shift mechanism 104 mounted on the rear sprocket 106 (see FIG. 1). The derailleur mechanism 104 is of generally conventional design, and operates to move a drive chain 108 between different gear wheels of the rear sprocket 106. The drive chain 108 delivers power from the front sprocket 68 to the rear sprocket 106, and thence to the rear wheel 28.

A brake lever 100 is mounted on the handlebars 30, typically on the opposite grip from the gear shift lever 110. Upon activation, the brake lever 100 operates a brake cable 112 that runs from the brake lever 100, down the outside of the handlebar support 32, rearwardly along the frame 22, and to a brake 114 mounted adjacent the tire of the rear wheel 28. The brake 114 is of conventional design, and is preferably a caliper type brake where each brake caliber pivots about a pivot point on the frame for added leverage and stopping power.

Figure 10:
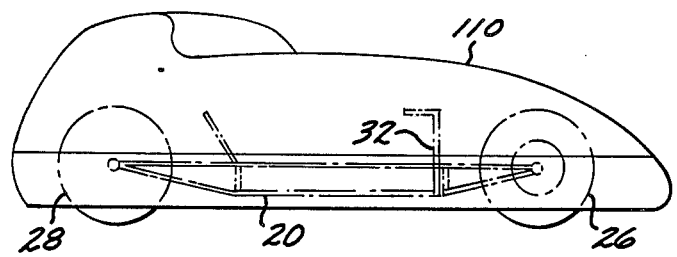
FIG. 10 is a side elevational view of the bicycle of FIG. 1, with a fairing in place, and with portions of the internal structure in phantom view.

The recumbent bicycle 20 of the invention may be operated without a fairing, or with a fairing 116 that reduces wind resistance, as illustrated in FIG. 10. The fairing 116 is typically a molded fiberglass covering that surrounds the previously described components of the recumbent bicycle 20, as well as the rider. Without a fairing, experience has shown that the recumbent bicycle 20 can be pedaled about 3 miles per hour faster than a standard upright bicycle, using essentially the same degree of exertion on the part of the rider. With a fairing 116, the wind resistance is reduced substantially, and the same effort required to pedal a standard bicycle at a speed of about 18 miles per hour will achieve a speed of about 30 miles per hour with the recumbent bicycle of the invention. Sustained speeds of 30 miles per hour are routinely achieved in touring with the present bicycle using a fairing, and in racing sustained speeds in excess of 40 miles per hour can be achieved.

Figure 11:
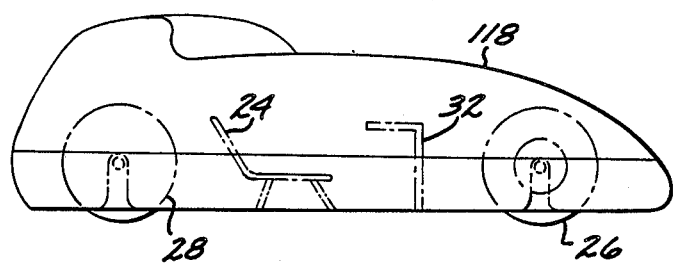
FIG. 11 is a side sectional view of an monocoque construction for the bicycle of the invention, with portions of the internal structure in phantom view.

In a similar approach, the recumbent bicycle can be built in a monocoque design, as illustrated in FIG. 11. In this approach, a covering shell 118 functions both as the structural frame and as the fairing to reduce wind resistance. The bicycle operating components, such as the axle for the rear wheel 26, the spindle housing 54, the handlebar support 32, and the seat 24 remain substantially identical to those previously described, but are mounted directly to the shell 118, either to the bottom as illustrated or to some other portion, by an appropriate support element. This design further reduces the weight of the bicycle 20.

The recumbent bicycle of the invention provides important advantages over prior recumbent bicycles. These advantages flow from the mechanism which permits placement of the crank spindle generally coincident with the axis of rotation of the front wheel, through the center bore of the spindle housing, and also allows the front wheel to be steerably and rotatably supported on the spindle housing. Although a particular embodiment of the invention has been described in detail for purposes of illustration, various modifications may be made without departing from the spirit and scope of the invention. Accordingly, the invention is not to be limited except as by the appended claims.

What is claimed is:

1. A recumbent bicycle, comprising:
   a frame having a seat thereupon;
   wheel means for permitting said bicycle to roll on the ground, said wheel means including a rotatable rear wheel supported by said frame, and a rotatable front wheel;
   front wheel support means for supporting and steerably turning said front wheel, and including a center bore therethrough extending transversely to said frame and substantially coaxial with the axis of rotation of said front wheel; and
   drive means for driving said bicycle, said drive means including a crank spindle disposed within said center bore, for providing motive power to said bicycle, the drive means including transmitting means for transmitting power from the crank spindle to the rear wheel of the bicycle.

2. The recumbent bicycle of claim 1, wherein said front wheel support means includes
   a spindle housing mounted transverse to said frame from a forwardly extending portion thereof, and having said center bore therethrough: and
   an intermediate hub steerably mounted on said spindle housing by an intermediate hub bearing, said front wheel being mounted on said intermediate hub.

3. The recumbent bicycle of claim 1, wherein said drive means includes
   a front sprocket mounted on one end of said crank spindle;
   a pair of crank pedal arms, one mounted on each end of said crank spindle and extending generally perpendicular to said crank spindle; and
   a pair of pedals, one mounted to each of said pedal crank arms.

4. The recumbent bicycle of claim 1, further including
   handlebars supported in said frame; and
   steering means for steerably turning said front wheel by the turning of said handlebars.

5. The recumbent bicycle of claim 2, wherein said intermediate hub bearing includes two tapered roller bearings, one of said bearings having an axis disposed upwardly and the other having an axis disposed downwardly.

6. The recumbent bicycle of claim 2, wherein said intermediate hub is formed as two pieces dimensioned to fit over said spindle housing and said intermediate hub bearing in a clamshell fashion.

7. The recumbent bicycle of claim 2, wherein said intermediate hub is formed as a single hollow cylindrical piece, and said crank spindle and intermediate hub are dimensioned such that said crank spindle can be inserted into said intermediate hub.

8. The recumbent bicycle of claim 1, wherein said seat is a bench seat.

9. The recumbent bicycle of claim 1, further including a fairing mounted over said frame.

10. The recumbent bicycle of claim 1, wherein said bicycle is of monocoque construction.

11. A recumbent bicycle, comprising:
   a frame having a seat, a front wheel support, and a rear wheel support, said front wheel support including a front fork with at least two arms extending from said frame;
   a spindle housing mounted transverse to said frame, said spindle housing being fixedly supported by said arms of said front fork and including a center bore therethrough;
   a front drive train assembly, including
   a crank spindle disposed within said center bore of said spindle housing, and being rotatably supported therein by a crank spindle bearing,
   a front sprocket mounted on one end of said crank spindle, a pair of pedal crank arms, one mounted on each end of said crank spindle and extending generally perpendicular to said crank spindle, and a pair of pedals, one mounted to each of said pedal crank arms;

a front wheel assembly, including an intermediate hub steerably mounted on said spindle housing by an intermediate hub bearing, and a front wheel mounted on said intermediate hub by a front wheel bearing;

a rear wheel assembly adapted for attachment to said rear wheel support and including a rear wheel rotatably mounted on a rear wheel axle;

a rear sprocket mounted to said rear wheel support, and adapted for driving said rear wheel assembly; and a drive chain extending from said front sprocket to said rear sprocket.

12. The recumbent bicycle of claim 11, further including handlebars supported in said frame; and steering means for steerably turning said front wheel by the turning of said handlebars.

13. The recumbent bicycle of claim 11, wherein said intermediate hub bearing includes two tapered roller bearings, one of said bearings having an axis disposed upwardly and the other having an axis disposed downwardly.

14. The recumbent bicycle of claim 11, wherein said intermediate hub is formed as two pieces dimensioned to fit over said spindle housing and said intermediate hub bearing in a clamshell fashion.

15. The recumbent bicycle of claim 11, wherein said intermediate hub is formed as a single hollow cylindrical piece, and said crank spindle and intermediate hub are dimensioned such that said crank spindle can be inserted into said intermediate hub.

16. The recumbent bicycle of claim 11, wherein said seat is a bench seat.

17. The recumbent bicycle of claim 11, further including a fairing mounted over said frame.

18. The recumbent bicycle of claim 11, wherein said bicycle is of monocoque construction, and said frame is a fairing.

* * * * *